US008571715B2

(12) United States Patent
Runkana et al.

(10) Patent No.: US 8,571,715 B2
(45) Date of Patent: Oct. 29, 2013

(54) ON-LINE OPTIMIZATION OF INDURATION OF WET IRON ORE PELLETS ON A MOVING GRATE

(75) Inventors: Venkataramana Runkana, Maharashtra, IN (US); Sushanta Majumder, Maharashtra, IN (US)

(73) Assignee: Tata Consultancy Services Limited (IN)

( * ) Notice: Subject to any disclaimer, the term of this patent is extended or adjusted under 35 U.S.C. 154(b) by 236 days.

(21) Appl. No.: 12/960,122

(22) Filed: Dec. 3, 2010

(65) Prior Publication Data

US 2011/0137444 A1 Jun. 9, 2011

(30) Foreign Application Priority Data

Dec. 4, 2009 (IN) .................. 2811/MUM/2009

(51) Int. Cl.
*G05B 21/00* (2006.01)
(52) U.S. Cl.
USPC ............................................. 700/274
(58) Field of Classification Search
USPC ............................ 700/103; 110/185
See application file for complete search history.

(56) References Cited

U.S. PATENT DOCUMENTS

| 4,239,530 | A | * | 12/1980 | Goksel .................. 75/478 |
| 4,809,190 | A | * | 2/1989 | Homer et al. .............. 700/285 |
| 6,384,126 | B1 | * | 5/2002 | Pirtle et al. .............. 524/493 |
| 6,513,024 | B1 | | 1/2003 | Li |
| 8,042,736 | B2 | * | 10/2011 | Santucci et al. ............ 235/380 |
| 2002/0013664 | A1 | | 1/2002 | Strackeljan |
| 2005/0092130 | A1 | * | 5/2005 | Golberger et al. .......... 75/10.39 |
| 2009/0193936 | A1 | | 8/2009 | Lu et al. |
| 2010/0139287 | A1 | * | 6/2010 | Kramer et al. ............ 60/781 |
| 2010/0219567 | A1 | | 9/2010 | Imanari et al. |
| 2010/0326338 | A1 | * | 12/2010 | Ahola .................. 110/230 |

FOREIGN PATENT DOCUMENTS

WO   20100902430   8/2010

OTHER PUBLICATIONS

Dominique Pomerleau, André Desbiens, and Daniel Hodouin, 11th Mediterranean Conference on Control and Automation, Title: "Optimization of a simulated iron-oxide pellets induration furnace" dated Jun. 17, 2003.

* cited by examiner

*Primary Examiner* — Kavita Padmanabhan
*Assistant Examiner* — Patrick Cummins
(74) *Attorney, Agent, or Firm* — Mayback & Hoffman, P.A.; Gregory L. Mayback

(57) ABSTRACT

The present invention discloses a system for optimizing the operation of an induration furnace and a method thereof; the system comprising: an interactive means to monitor and control the furnace to provide an optimized furnace operation, calibration means for generating a plurality of ideal set points for validation purposes, and a processing unit receiving, in real-time, the online process data from the interactive means and compute therein a plurality of real-time active set points which are matched with corresponding ideal set points from the calibration means, wherein, if optimization is required, an optimizing signal is generated and communicated to the interactive means. The system predicts in real-time the process and product parameters, that cannot be measured directly, thus, providing real-time optimization of the furnace operation, and thereby reducing the operating and production costs.

14 Claims, 9 Drawing Sheets

ON-LINE OPTIMIZATION OF INDURATION OF WET IRON ORE PELLETS ON A MOVING GRATE

CROSS-REFERENCE TO RELATED APPLICATIONS

This application claims the priority, under 35 U.S.C. §119, of Indian patent application No. 2811/MUM/2009, filed Dec. 4, 2009; the prior application is herewith incorporated by reference in its entirety.

STATEMENT REGARDING FEDERALLY SPONSORED RESEARCH OR DEVELOPMENT

Not applicable.

FIELD OF THE INVENTION

The present invention relates to the field of automated process control. Particularly, the present invention relates to a system for optimization of the operation of an induration furnace.

BACKGROUND OF THE INVENTION

Production of iron ore pellets in the iron and steel industries usually requires the stages of ore concentration and agglomeration of the iron-ore concentrates. The iron ore pelletization process consists of two key stages in which the iron ore fines are fed along with a mixture of binder (for example, bentonite), fuel (coal or coke) and flux (for example, limestone), and moisture to balling devices such as a rotating drum or disc to produce wet or green pellets. These wet pellets are loaded onto the strand of a moving grate to form a granular packed bed at the feed end of the induration furnace. Induration is essentially a heat treatment process in which the wet pellets are exposed to high temperatures and then cooled in order to impart the necessary mechanical and chemical properties and obtain the fired pellets.

A straight-grate induration furnace is used for the induration process of the wet pellets through thermal processing at elevated temperatures. As the strand of the moving grate moves from the feed end to the discharge end, the granular packed bed is subjected to increasingly hot process gas to dry and fire the pellets, and then ambient air is passed to cool the pellets. During the induration process several complex phenomena occur such as drying, hardening (or cooking), melting, and cooling of pellets, coke combustion, magnetite oxidation, and limestone calcination.

Typically, the straight-grate induration furnace comprises seven zones including an updraft drying (UDD) zone, a downdraft drying (DDD) zone, a preheating (PH) zone, a firing (F) or ignition (IGN) zone, an after-firing (AF) zone, a first phase cooling (CZ1) zone and a second phase cooling (CZ2) zone. Inside the furnace the gas/air streams flow through the porous moving bed vertically in cross-current direction with respect to the bed movement from the feed end to the discharge end. Multivariable interactions of the physico-chemical processes on the moving grate of the furnace make the process highly interactive and thus complex to control.

The quality of the iron ore pellets formed from the induration process is defined by the strength they achieve during this thermal processing and, has a direct relationship with the time-temperature history the wet pellets are exposed to inside the furnace. Due to the lack of any means to directly measure the granular packed bed temperature profile inside the furnace, the operation is controlled indirectly based on the maximum temperature of the off-gas exiting the bed below the strand of the moving grate. However, monitoring the off-gas temperature does not reveal the complete thermal picture of the granular packed bed. Also, the fired iron ore pellets discharged from the furnace have to be taken to a laboratory for off-line testing, in the absence of any real-time means to measure their strength. This information, however, can be obtained every 2 hr or 4 hr intervals only because of the time required for sample collection and testing in the laboratory apparatus.

Therefore, there is a need for a real-time optimization system which is based on reliable process models to detect and modify the process parameters to increase the process efficiency in terms of increasing the level of production, reducing the operating costs, improving the product quality control and reducing the energy and fuel consumption.

Several attempts have been made to automate process control and provide real-time optimization, some of these disclosures are listed in the prior art below:

U.S. Pat. No. 6,513,024 discloses a self-optimizing method and an article thereof for rapidly improving or optimizing performance of an object by carrying out several automatic experimental cycles on selected control variables as per computer-designed test matrices. The article comprises a computer readable program code means for performing a plurality of computerized automatic experimental cycles on the optimizable object relative to a plurality of control variables, wherein the computer readable program code means performs the steps of: computer-planning a designed experiment for each of the cycles, computer-executing each experimental cycle to obtain test results, computer-analyzing the test results for optimizing the performance of the object, computer-coding for storage in a readable form, and computer-storing.

US Publication No. 2002013664 discloses a system and method for control and monitoring of rotating equipment. The disclosure in US2002013664 provides a computer-implemented method for monitoring a mechanical component using a neural network or weighted distance classifier, wherein the method references a predetermined set of candidate data features for a sensor measuring an operational attribute of the component and derives a subset of those features which are then used in real-time to determine parameter variables. The database is updated in real-time when an anomalous measurement is encountered.

US Publication No. 2009193936 discloses a method and system for on-line quality prediction and control in an oxygen furnace. The system in accordance with US2009193936 comprises a database configured to store historical data associated with a first turndown quality, a prediction module coupled to the database, including a computer-implemented model of the furnace based on support vector regression which is a statistical technique to produce a prediction of first turndown quality and further configured to receive the historical data, and a run-to-run control module coupled to the prediction module and configured to apply the model to the historical data to obtain a prediction of first turndown quality and compare the prediction to an actual measurement to adjust a control recipe for the oxygen furnace.

US Publication No. 2010219567 discloses an apparatus and a method thereof for controlling a process line such as continuous annealing line or plating line where steel material is continuously processed. The method as disclosed in US2010219567 comprises measuring quality of the steel material at a position preceding the heating process and a position succeeding the cooling process, checking the measurement results to determine whether the material is acceptable or not on the basis of a determination criteria, recording in a database, correcting process conditions including heating or cooling temperatures, and conveyance speed of the steel material.

PCT Publication No. WO201092430 discloses a method and a system for optimization of parameters for a recovery boiler. The system of WO201092430 discloses a process model component having a process model describing relationship between various process variables for at least one unit, a parameter estimation component to estimate at least one unit parameter, a controller component to control a second unit based on the estimated parameter, wherein the process model is based completely or partially on a first principle mathematical model and the parameter estimation component uses online measurements made along the various units of the boiler, computation of process variables using the process model, use of laboratory data to estimate the boiler parameters that are not directly measurable.

A technical paper published by Dominique Pomerleau et. al., in the 11$^{th}$ Mediterranean Conference on Control and Automation, titled "Optimization of a simulated iron-oxide pellets induration furnace", suggests real-time optimization of the induration furnace based on reliable process models using IMC-optimization algorithm, a static nonlinear optimization algorithm, the model providing process parameters like gas stream temperature profile, energy balance and pressure drop in the gas streams.

The present invention discloses one such optimization system, particularly for an induration furnace used for the production of iron ore pellets, which uses a model-based component for predicting in real-time, process and pellet quality parameters that cannot be measured on-line and simulation and optimization algorithms, which are used to implement real-time optimization of the operation of the induration furnace, to optimize the productivity without affecting the product quality.

SUMMARY OF THE INVENTION

An object of the present invention is to provide a system to optimize the operation of an induration furnace used for the production of iron ore pellets.

Another object of the present invention is to provide a system for optimizing the operation of an induration furnace which increases the furnace productivity.

Still another object of the present invention is to provide a system for optimizing the operation of an induration furnace which continuously monitors the operation of the induration furnace, suggests optimum values of manipulated process parameters and thereby gives a consistent product quality.

Yet another object of the present invention is to provide a system for optimizing the operation of an induration furnace which predicts in real-time the process parameters that cannot be measured directly, for example, temperature and chemical composition profiles of pellets and gases inside the furnace, along the entire length and height of the furnace.

One more object of the present invention is to provide a system for optimizing the operation of an induration furnace which predicts in real-time the fired pellet quality parameters including cold compressive strength, tumble index and abrasion index, which cannot be measured directly.

Still one more object of the present invention is to provide a system for optimizing the operation of an induration furnace which reduces fuel consumption by the furnace.

Yet one more object of the present invention is to provide a system for optimizing the operation of an induration furnace which continuously provides in real-time the thermal conditions inside the furnace, a critical factor that has strong impact on fired pellet quality.

An additional object of the present invention is to provide a system for optimizing the operation of an induration furnace which reduces the overall operating and production costs of the induration process.

In accordance with the present invention, is provided a system for optimizing the operation of an induration furnace, said system comprising:

interactive means to monitor and control the furnace to provide an optimized furnace operation, said interactive means selected from a group consisting of a programmable logic controller (PLC), a distributed control system (DCS), and a supervisory control and data acquisition system (SCADA), said interactive means adapted to communicate with the furnace, to retrieve, in real-time, online process data, and adapted to send, in real-time, the online process data for processing, and to receive therein an optimizing signal, to be communicated, to the furnace, for altering at least one process condition of the furnace;

calibration means for generating a plurality of ideal set points for validation purposes, said calibration means comprising a laboratory information system for receiving process information relating to the furnace, said process information being at least one selected from a group consisting of fired pellet quality parameters, physical characteristics of the iron ore, chemical characteristics of the iron ore, physical characteristics of the fuel (coal or coke), chemical characteristics of the fuel (coal or coke), physical characteristics of the flux (limestone) and chemical characteristics of the flux (limestone), and adapted to process the information to generate a plurality of ideal set points to calibrate the furnace to operate at an optimized level; and a processing unit adapted to perform real-time optimization, said processing unit adapted to receive, in real-time, the online process data and the plurality of ideal set points, and comprising: computational means configured to compute a plurality of real-time active set points, using the online process data; corroboration means configured to match at least one of the plurality of real-time active set points with a corresponding ideal set point; alerting means configured to generate a signal, for optimization of at least one process condition, if at least one of the plurality of real-time active set point does not match the corresponding ideal set point; optimization means configured to, on receiving the signal from said alerting means, generate at least one optimizing signal, which is communicated to said interactive means, for optimizing the operation of the furnace.

Typically, in accordance with the present invention, said processing unit comprises receiver means to receive the online process data from said interactive means and the plurality of ideal set points from said calibration means.

Preferably, in accordance with the present invention, said processing unit comprises a central repository to store the online process data, the plurality of ideal set points, the plurality of real-time active set points, and the optimizing signal, for a predetermined duration.

In accordance with the present invention, said computational means is further adapted to compute, using the online process data, the directly immeasurable process parameters including the thermal profile of pellets and gas streams, the composition profile of pellets and gas streams, pressure drop of the gas streams, pellet moisture drying profile, coal or coke combustion profile and limestone calcination profile across various sections of the furnace, and fired pellet quality parameters, including, cold compressive strength, tumble index and abrasion index.

Preferably, in accordance with the present invention, said processing unit includes output means adapted to transmit the optimizing signal to said interactive means and said central repository.

Typically, in accordance with the present invention, a display module is provided between said interactive means and said processing unit.

Preferably, in accordance with the present invention, the online process data and the process information comprise dimensions of various sections of the furnace, wet iron ore pellet properties such as particle size distribution, chemical composition, moisture content, and particle size distributions of coal/coke and limestone, gas stream temperature, chemical composition, moisture content, pressure and flow rate, bed height, grate speed and details of the hearth layer.

In accordance with the present invention, is provided a method for optimizing the operation of an induration furnace used for producing iron ore pellets, said method comprising the steps of:
- generating a plurality of ideal set points, for validation purposes, by processing process information relating to the furnace selected from a group consisting of fired pellet quality parameters and physical and chemical characteristics of the iron ore, fuel (coal or coke) and flux (limestone), in calibration means having a laboratory information system;
- retrieving, in real-time, the online process data, through interactive means selected from a group consisting of a programmable logic controller, a distributed control system, and a supervisory control and data acquisition system, wherein said interactive means are provided in communication with the furnace for real-time monitoring and control of the furnace, to provide an optimized furnace operation;
- transmitting the online process data and the plurality of ideal set points to a processing unit for real-time optimization;
- computing a plurality of real-time active set points by processing the online process data in computational means of said processing unit;
- matching at least one of the plurality of real-time active set points with a corresponding ideal set point in corroboration means of said processing unit;
- signaling for optimization in alerting means of said processing unit, if at least one of the plurality of real-time active set points does not match the corresponding ideal set point;
- generating at least one optimizing signal in optimization means of said processing unit, for altering at least one process condition of the furnace; and
- communicating the optimizing signal to said interactive means for optimizing the operation of the furnace, in real-time.

Typically, in accordance with the present invention, the method for optimizing the operation of an induration furnace includes the step of storing the online process data, the plurality of ideal set points, the plurality of real-time active set points, and the optimizing signal in a central repository.

Preferably, in accordance with the present invention, the method for optimizing the operation of an induration furnace includes the step of transmitting the optimizing signal manually or automatically to said interactive means.

Typically, in accordance with the present invention, the method for optimizing the operation of an induration furnace includes the step of interfacing said processing unit with the furnace via said interactive means.

In accordance with the present invention, the method for optimizing the operation of an induration furnace includes the step of obtaining a detailed analysis of the process in the off-line mode.

Typically, in accordance with the present invention, the method for optimizing the operation of an induration furnace includes the step of optimizing the process condition selected from the group consisting of height of the pellet bed, speed of the moving grate, flow rate of the cooling gas streams, temperature of the ignition gas and pressure drop of the gas streams in various sections of the furnace.

Preferably, in accordance with the present invention, the method for optimizing the operation of an induration furnace includes the step of selecting the plurality of set points from the flow rate of pellets on the grate and the quality parameters of the final product.

BRIEF DESCRIPTION OF THE DRAWINGS

The invention will now be described with the help of the accompanying drawings, in which.

DETAILED DESCRIPTION OF THE INVENTION

Figure 1:
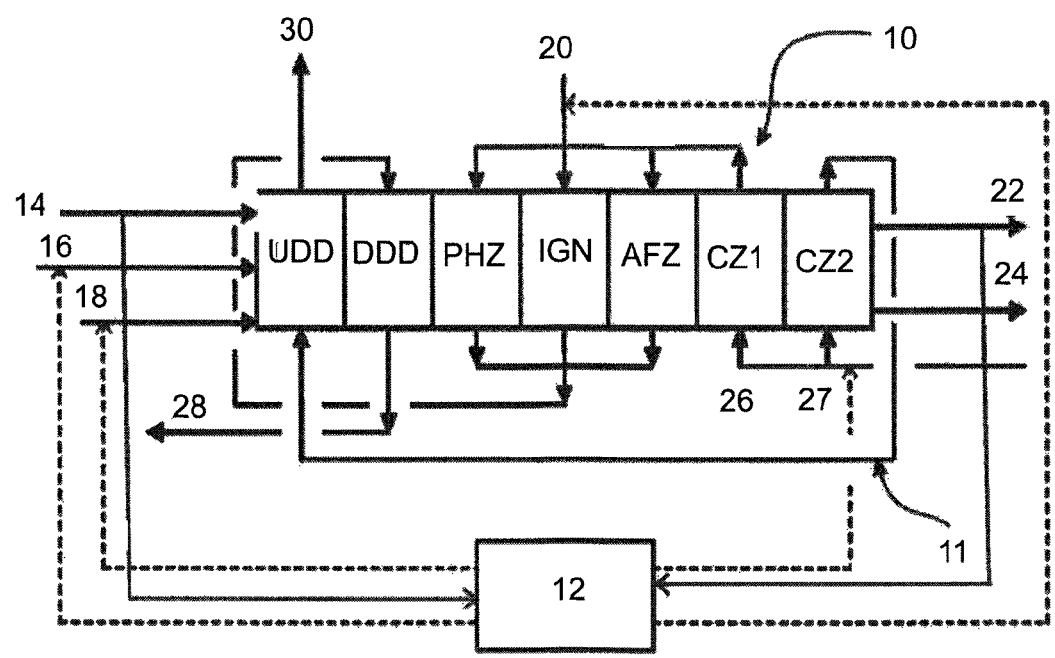
FIG. 1 illustrates a schematic showing the optimization system in communication with the induration furnace in the operating condition, in accordance with the present invention.

The invention will now be described with reference to the accompanying drawings which do not limit the scope and ambit of the invention. The description provided is purely by way of example and illustration.

The present invention envisages a system for optimizing the operation of an induration furnace. The system of present invention uses a model-based optimization component which is developed on the basis of fundamental principles of heat and mass transfer between the interacting phases inside the furnace, kinetics of evaporation and condensation of moisture, kinetics of the chemical reactions for coke combustion and limestone calcination during the operation, and the flow rate of gas streams through the porous granular packed bed. The system of present invention monitors the flow rate of the iron ore pellets in the granular packed bed on the moving grate of the furnace, and the flow rate of the various gas streams inside the furnace, and predicts the iron ore pellet strength and other quality parameters along with the permeability, porosity, carbon consumption profile, limestone consumption profile and the moisture drying profile of the iron ore pellet bed at various sections of the furnace. Further, the system of the present invention predicts the directly immeasurable process parameters like thermal profile of the solid phase and the gas phase inside the furnace at various sections of the furnace, composition profile of the various chemical species inside the furnace for both the solid and the gas phases, and the gas phase pressure drop across the various zones of the furnace.

Furthermore, the system of the present invention, predicts the moisture concentration profile, carbon concentration profile and calcium carbonate concentration profile across the dimensions of the pellet bed and the permeability of the solid porous bed. It also predicts the oxygen, carbon dioxide and moisture concentrations in the gas phase along the length and height of the furnace. For this purpose, the system is automatically tuned and calibrated using the off-gas temperatures under the bed. The system can be used in an on-line and an off-line mode over various operating ranges. In the on-line mode, the system is interfaced with the furnace through interactive means which monitor and control the operations of the furnace, in real-time. In the off-line mode the system can be used for detailed analysis and diagnostics of the process.

The system of the present invention primarily comprises: interactive means provided in communication with the furnace during the operation to retrieve, in real-time, the online process data, from, for example, a programmable logic control or a distributed control system or a supervisory control and data acquisition system, and a laboratory information and management system; said interactive means are adapted to receive therein an optimizing signal, to alter at least one process condition of the furnace; calibration means that generate a plurality of ideal set points for validation purposes; a processing unit which: computes using the online process data a plurality of real-time active set points in computational means, corroboration means for matching at least one of the plurality of real-time active set points with a corresponding ideal set point, alerting means which generate a signal if at least one of the plurality of real-time active set points does not match the corresponding ideal set point, and optimization means generating an optimizing signal to alter at least one process condition of the furnace; the interactive means receives the optimizing signal, to alter at least one process condition of the furnace, which is communicated to the furnace, in real-time, thereby enhancing the productivity while maintaining the product quality within desirable specifications. The system is provided with a central repository for storing the process related data for day-to-day logging. Optionally, the processing unit further comprises an output means which is provided in communication with the optimization means, to transmit the optimizing signal to the interactive means and the central repository.

The computational means envisaged in the present invention comprise a plurality of models having a set of nonlinear partial differential and algebraic equations which assist in computing, using the real-time online process data, the overall material balance and energy balance of the gas phase and the solid phase, the material balances for all individual species in each phase along the entire length and height of the furnace, and the gas phase pressure drop inside the furnace. The computational means, on the basis of the online process data, simulate the furnace operation by dividing the granular packed bed containing iron ore pellets into fine meshes across the entire dimension of the granular packed bed. At each of these meshes the model equations are solved to estimate the overall state of the process.

FIG. 1 illustrates a schematic showing the optimization system of the present invention in communication with a straight-grate induration furnace in the operating condition, the furnace represented generally by reference numeral 10. The system, represented generally by reference numeral 12, for optimizing the operations of the induration furnace 10, is connected to the interactive means (not shown in FIG. 1) comprising a programmable logic controller (PLC) or a distributed control system (DCS) or a supervisory control and data acquisition system (SCADA) which in turn controls the process conditions of the induration furnace 10.

Typically, the straight-grate induration furnace 10 consists of seven zones including an updraft drying zone (UDD), a downdraft drying zone (DDD), a preheating zone (PHZ), an ignition zone (IGN), an after-firing zone (AFZ), a first cooling zone (CZ1) and a second cooling zone (CZ2). Wet iron ore pellets are placed on the moving grate of the induration furnace 10 in the form of a granular packed bed. When the moving grate is in operation, the wet iron ore pellets enter the UDD zone of the induration furnace 10 and are subjected to a hot gas for drying the wet pellets in the UDD and the DDD zones. The wet iron ore pellets are dried in an updraft drying mode in the initial drying phase in the UDD and a downdraft drying mode in the second phase of drying in the DDD. A significant amount of water contained in the wet iron ore pellets is evaporated in the UDD and the DDD zones. From the second drying zone DDD, the granular packed bed of dried iron ore pellets enters the PHZ of the induration furnace 10 where the sintering or firing process starts. The sintering process is accelerated in the IGN and AFZ zones by the heat emitted from a hood burner represented generally by 20. The heat from the hood burner 20 enters the induration furnace 10 at the IGN zone. After firing, the iron-ore pellets are sent to the cooling zones (CZ1 and CZ2) for cooling the pellets to a suitable handling temperature.

The cooling air stream 26 enters the induration furnace 10 at cooling zone CZ1 and passes through the iron ore pellet bed. The stream 26 coming out from the cooling zone CZ1 has an average temperature of typically, 1000° C. The stream 26 is then distributed and is pulled downdraft through the granular packed bed of iron ore pellets in the PHZ, IGN and AFZ zones using a blower. The IGN zone is further provided with additional heat from the hood burners 20, thus raising the temperature of the new gas stream to about 1200° C. to 1300° C. The gas stream 26 from the firing zones PHZ, IGN and AFZ is recuperated and used in the downdraft drying zone DDD for the second phase of drying. The exhaust gas stream 28 is discharged from the DDD.

Another cooling air stream 27 entering the induration furnace 10 passes updraft through the second cooling zone CZ2.

The exhaust gas stream 11 from CZ2 is further recycled to the UDD for the initial drying phase. The exhaust gas stream 30 is discharged from the UDD.

The system 12 receives information concerning the wet iron ore pellet properties including wet pellet size distribution (PSD) and wet pellet composition (collectively represented in FIG. 1 by 14), and pellet quality represented generally by 22. From the data provided, the system 12 generates an output providing the suitable height of the iron-ore pellet bed 16 entering the induration furnace 10, the optimum speed at which the moving grate should be operated 18, flow rate of the cooling gas streams 26 and 27, and temperature profile of the ignition gas entering at 20. This output from system 12 helps in maximizing the production 24 without compromising on the desired product quality 22. The system 12 is provided with means to predict, in real-time, the strength and the quality of the fired iron-ore pellets produced by the furnace 10. Thus, the system 12 provides direct means to monitor the quality of the final product produced. Also, in case the quality of the final product does not meet the specified standards, the process conditions of the furnace are altered, in real-time, thus saving time and energy.

Figure 2:
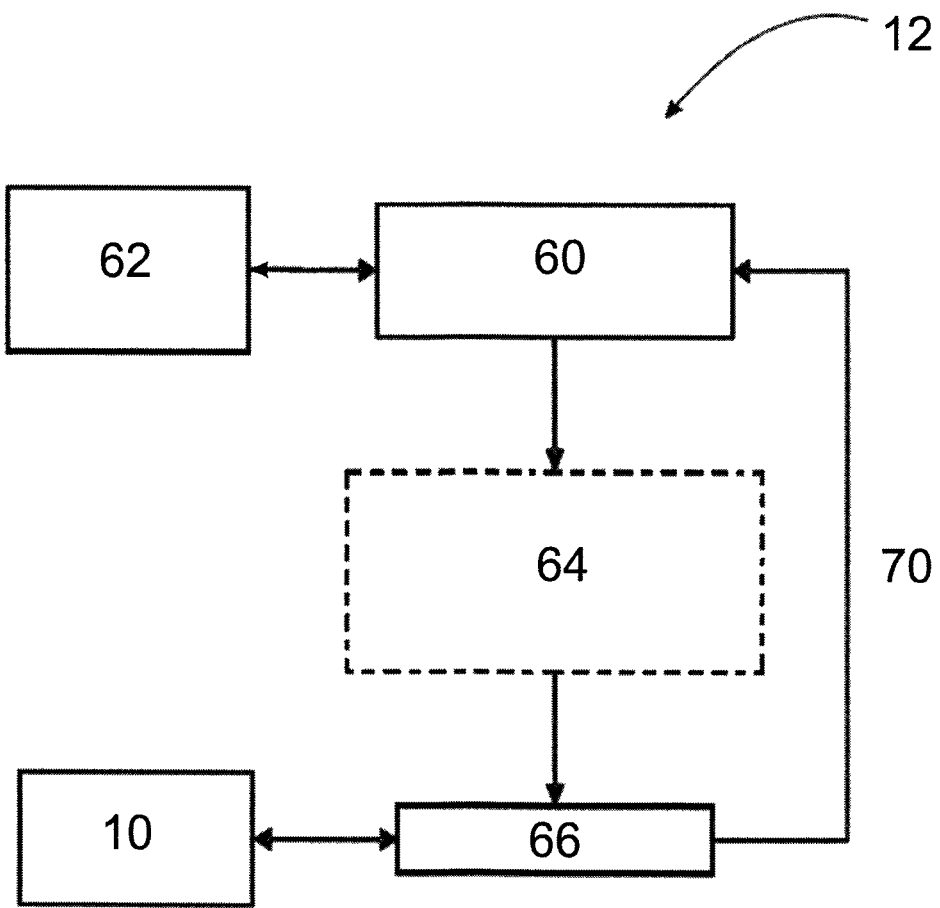
FIG. 2 illustrates a schematic of the system for optimizing the operation of an induration furnace in the operating condition, in accordance with the present invention.

FIG. 2 illustrates a schematic of the system 12 in operative configuration with the induration furnace 10. The interactive means, referred by numeral 66, comprises a programmable logic controller (PLC) or a distributed control system (DCS) or a supervisory control and data acquisition system (SCADA), which allows the system 12 to be interfaced with the furnace 10 during the operation, to continuously retrieve, in real-time, the online process data. The interactive means 66 monitors and controls the furnace operation to provide an optimized furnace operation. The process information in relation to the operation to be carried out in the furnace 10, is received by the calibration means, referred by numeral 62, which comprises a laboratory information system, receives and processes therein the process information related to the furnace 10, and generates a plurality of ideal set points, which are used for validation purposes. The plurality of ideal set points generated by the calibration means 62 take into consideration the desired final pellet quality, physical and chemical properties of iron ores, fuel (coal or coke), flux (limestone) and binder (bentonite), to calibrate the furnace to operate at an optimized level.

The online process data retrieved by the interactive means 66 is provided to the processing unit, represented by numeral 60, through line 70, for processing. The interactive means 66 are directly connected to the furnace 10, to, in real-time, monitor the operating conditions inside the furnace 10. These process details are forwarded to the processing unit 60. The processing unit 60 also receives the plurality of ideal set points from the calibration means 62. In the processing unit 62, by using the online process data, computes a plurality of real-time active set points, which are temporarily stored in the calibration means 62. In the processing unit 60, the plurality of real-time active set points are matched with the corresponding ideal set points, to determine if optimization is required to maintain the desired product quality. In case when optimization is required, an optimizing signal for altering at least one process condition of the furnace 10, is generated, which is communicated with the interactive means 66, refer FIG. 2. The optimizing signal can be manually or automatically transmitted to the interactive means 66. Optionally, a display module, represented by numeral 64, can be provided between the processing unit 60 and the interactive means 66, wherein the optimizing signal is transmitted to the interactive means 66 through the display module 64. The optimizing signal, for altering at least one process condition of the furnace 10, is then communicated to the furnace 10, by the interactive means 66, so as to optimize the operating conditions, and thereby optimize the productivity without hampering the final product quality.

In accordance with a preferred embodiment of the present invention, the system 12 can be used in an on-line as well as an off-line mode for the various operating ranges. In the on-line mode, the system 12 is interfaced with the induration furnace 10 through the interactive means 66. While, in the off-line mode the system 12 is used for detailed analysis of the process. The system 12 also provides on-line control of the process.

Figure 3:
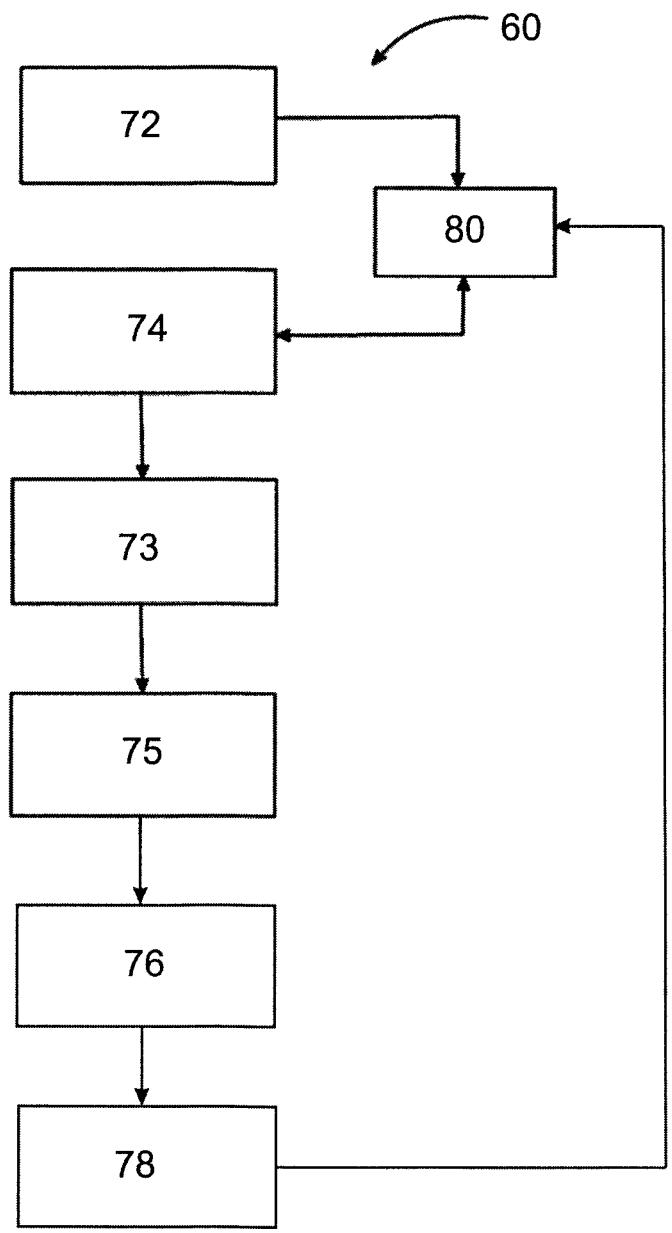
FIG. 3 illustrates a schematic of the processing unit of the system for optimizing the operation of an induration furnace, in accordance with the present invention.

FIG. 3 illustrates a schematic of the processing unit 60 of the system 12 of present invention. The processing unit 60 typically comprises: receiver means 72, computational means 74, a central repository 80, corroboration means 73, alerting means 75, optimization means 76, and output means 78.

The processing unit 60, adapted to perform real-time optimization, communicates with the interactive means 66 and the calibration means 62 to extract the online process data and the plurality of ideal set points. This data is received by the receiver means 72, wherein the online process data comprises: details of the furnace dimensions, the wet iron ore pellet properties, the flow inputs, and the granular packed bed details.

The furnace dimensions and input parameters generally include:
length of each furnace section, viz., UDD, DDD, PHZ, IGN AFZ, CZ1, and CZ2;
grate speed;
total number of wind-boxes;
length of each wind-box;
number of burners in the firing hood;
location of burners in the firing hood; and
spacing between burners in the firing hood;
The wet iron ore pellet properties generally include:
iron ore pellet size distribution (PSD);
iron ore pellet chemical composition;
iron ore pellet moisture content;
chemical composition and moisture content of coal/coke;
chemical composition and moisture content of limestone; and
particle size distributions of coal/coke and limestone;
The flow inputs generally include:
wet iron ore pellet flow rate to the grate;
temperature of wet iron ore pellets;
pressure, temperatures and flow rate of inlet gas streams; and
chemical composition and moisture content of inlet gas streams
The granular packed bed details generally include:
total height of the granular packed bed;
height of the hearth layer; and
particle size distribution and chemical composition of the hearth layer This real-time process data and the plurality of ideal set points, extracted by the receiver means 72, is stored in the central repository 80, for day-to-day data logging. This data is extracted by the computational means 74, from the central repository 80, to calculate the throughput of the fired iron ore pellets from the moving grate of the induration furnace 10 and the quality parameters of the final pellets from the induration furnace 10, thereby generate a plurality of real-time active set points. Additionally, the computational means 74 derive the permeability and the moisture drying profile of the iron ore pellet bed inside the induration furnace 10 at various sections of the furnace 10, the overall material balance and energy balance of the gas streams and the iron ore pellets, the material balances for all individual species in each phase along the entire length and height of the induration furnace 10 and the pressure drop of the gas streams inside the furnace 10.

The computational means 74 by processing, in real-time, the online process data, predicts the directly immeasurable process parameters like thermal profile of the iron ore pellets and the gas streams inside the induration furnace 10 at various sections of the furnace 10, composition profile of the various chemical species inside the induration furnace 10, and the pressure drop of the gas streams across the various zones of the induration furnace 10. The computational means 74 further predicts the moisture concentration profile, carbon concentration profile and calcium carbonate concentration profile across the dimensions of the iron ore pellet granular packed bed on the moving grate of the induration furnace 10. The computational means 74 also predicts the oxygen, carbon dioxide and moisture concentrations in the gas phase along the length and height of the induration furnace 10.

The plurality of real-time active set points and the plurality of ideal set points are received in the corroboration means 73, wherein the corroboration means are configured to match at least one of the plurality of real-time active set points with a corresponding ideal set point, to verify if the furnace is operating suitably. If at least one of the plurality of real-time active set points does not match the corresponding ideal set point, the data is passed to the alerting means 75. The alerting means 75 generates a signal for optimization of the furnace operation. This signal is received in the optimization means 76 which generates an optimizing signal, to alter at least one process condition of the furnace 10. The process condition to be optimized is selected from: height of the pellet bed, speed of the moving grate, flow rate of the cooling gas streams, temperature of the ignition gas and pressure drop of the gas streams. The optimizing signal is transmitted to the interactive means 66 and the central repository 80 via the output means 78. The interactive means 66 receives the optimizing signal and thereby optimizes the operation of the furnace, in real-time.

Figure 4:
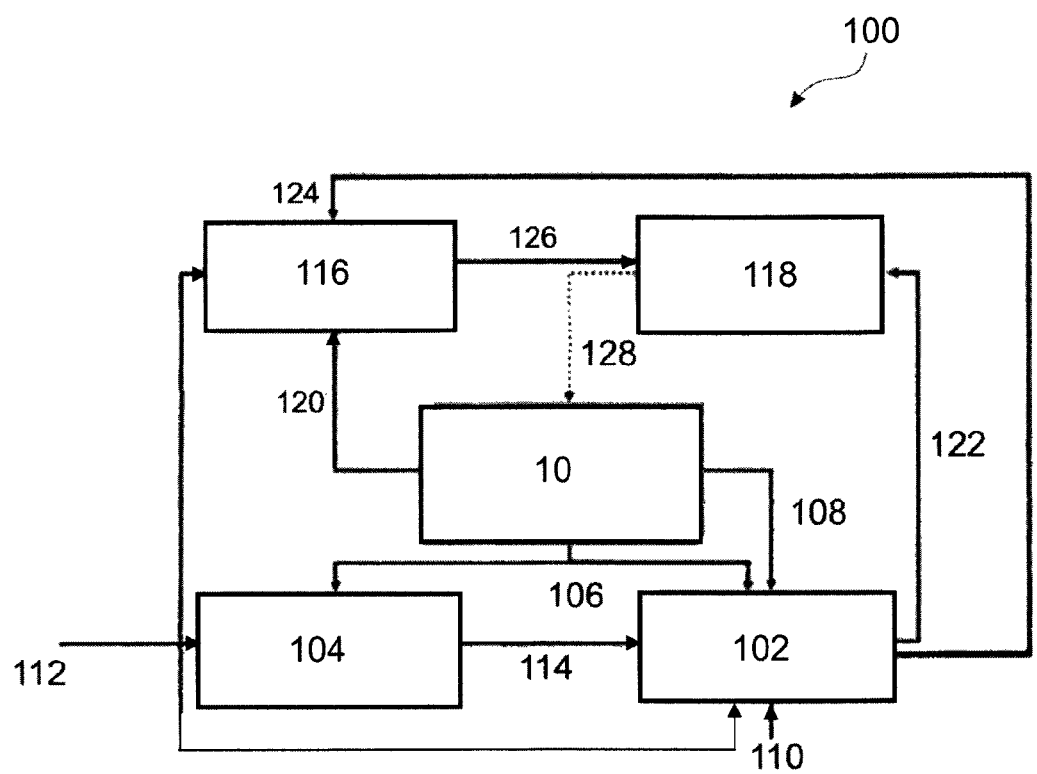
FIG. 4 illustrates a schematic of the model of the optimization system in operative communication with the induration process, in accordance with the present invention.

In FIG. 4, is shown a schematic of the model of the optimization system in operative communication with the induration process, represented in FIG. 4 by numeral 100. The computational means 74 comprises an induration process model 102, a permeability model 104, and a quality model 116, which are mathematical models based on the fundamental principles of material and energy balances, reaction kinetics of the chemical reactions occurring inside the furnace 10, and flow of gases through porous granular packed bed. The models use a set of nonlinear partial differential and algebraic equations to compute the overall material balance and energy balance of the gas streams and the iron ore pellets, the material balances for all individual species in each phase along the entire length of the furnace 10 and the pressure drop in gas streams inside the furnace 10. The induration model 102, the permeability model 104, and the quality model 116 receive process information, in relation to the operation to be carried out in the furnace 10, including bed height, and pressure drop (refer 106), hood temperature, grate speed, gas flow rates (refer 108), pellet chemical composition details and physical properties of iron ore, fuel (coal/coke) and flux (limestone) (refer 110), measured process variables (refer 120), pellet size distribution and gas properties (refer 112), gas velocity (refer 114). The models predict the quality parameters (refer 126) and burn-through temperature (refer 122) which are sent to the optimization means, represented in FIG. 4 by numeral 118, to generate the optimizing signal 128 which is sent to the furnace 10, wherein the optimizing signal includes altering process conditions of the furnace 10 including bed height, grate speed, cooling gas stream flow rate, hood temperature profile and gas phase pressure drop in different sections of the furnace.

The models, as illustrated in FIG. 4, also comprise a set of sub-units. The set of sub-units compute data which is to be sent to the models to generate the real-time measure of the iron ore pellet bed properties and the gas phase properties.

The set of sub-units comprise the following:
  a heat transfer computational unit which computes the overall energy balance of the gas streams and the iron ore pellets by using a set of partial differential equations to estimate the heat transfer details during the operation;
  a mass transfer computational unit which computes the overall material balance of the gas streams and the iron ore pellets and material balances of individual chemical species in the gas phase and the pellets, by using a set of partial differential equations to estimate the mass transfer details during the operation;
  a reaction kinetics computational unit which evaluates the reaction kinetics of all the chemical reactions occurring during the operation (combustion of coal or coke and calcination of limestone); and
  a pellet melting computational unit which estimates the iron ore pellet melting profile during the operation;

The real-time estimate of the iron ore pellet bed properties include:
  the iron ore pellet bed temperature profile; and
  the iron ore pellet bed composition profile;

The real-time estimate of the gas phase properties including:
  flow rate, pressure, temperature and chemical composition of the off-gases;
  pressure and velocity profiles of the gas phase throughout the furnace;
  the temperature profile of the gas phase throughout the furnace; and
  the chemical composition profile of the gas phase throughout the furnace.

The output generated by the models of the computational means 74 is also stored in the central repository 80 for day-to-day data logging.

Figure 5:
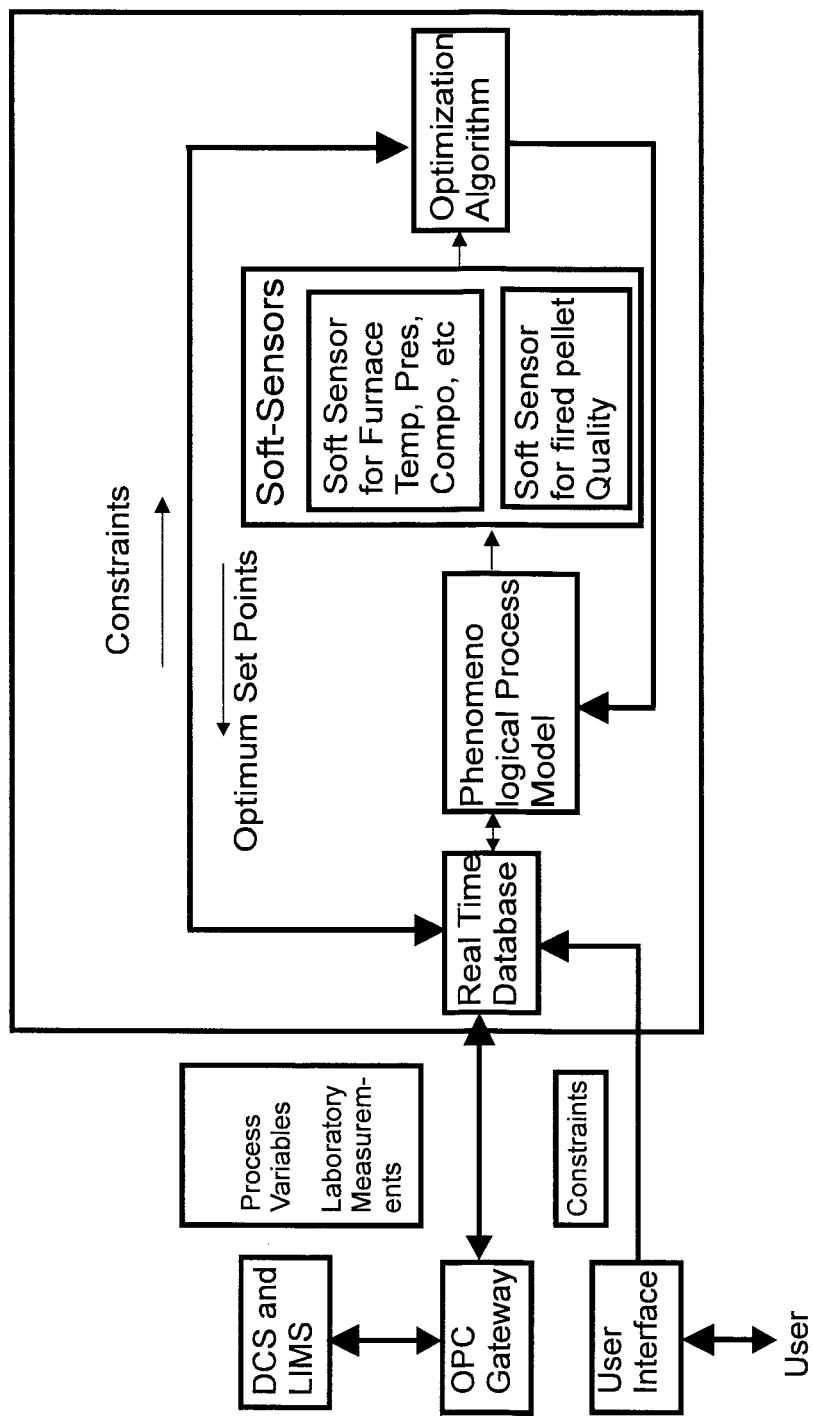
FIG. 5 illustrates a schematic of the online optimization process, in accordance with the present invention.

Referring to FIG. 5, is shown a schematic of the online optimization system, wherein the real-time process data and the laboratory measurements are received in the real-time database of the optimization system of the present invention. The information is received by the process models for processing and soft sensors to determine directly immeasurable process parameters, and finally for optimization wherein the optimum set points are communicated to the PLC/DCS/SCADA, in real-time.

Figure 6:
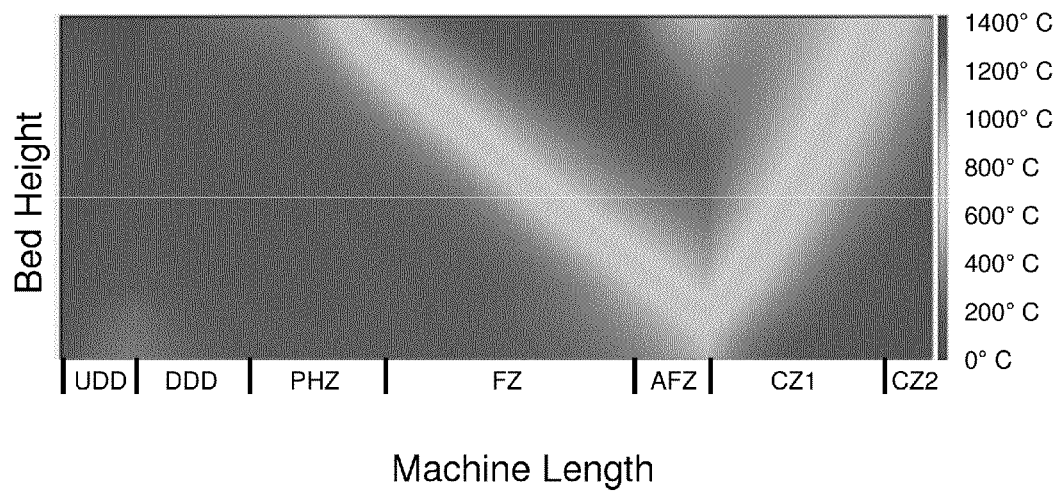
FIG. 6 illustrates a schematic showing the real-time prediction of the pellet bed temperature contours, in accordance with the present invention.
Figure 7:
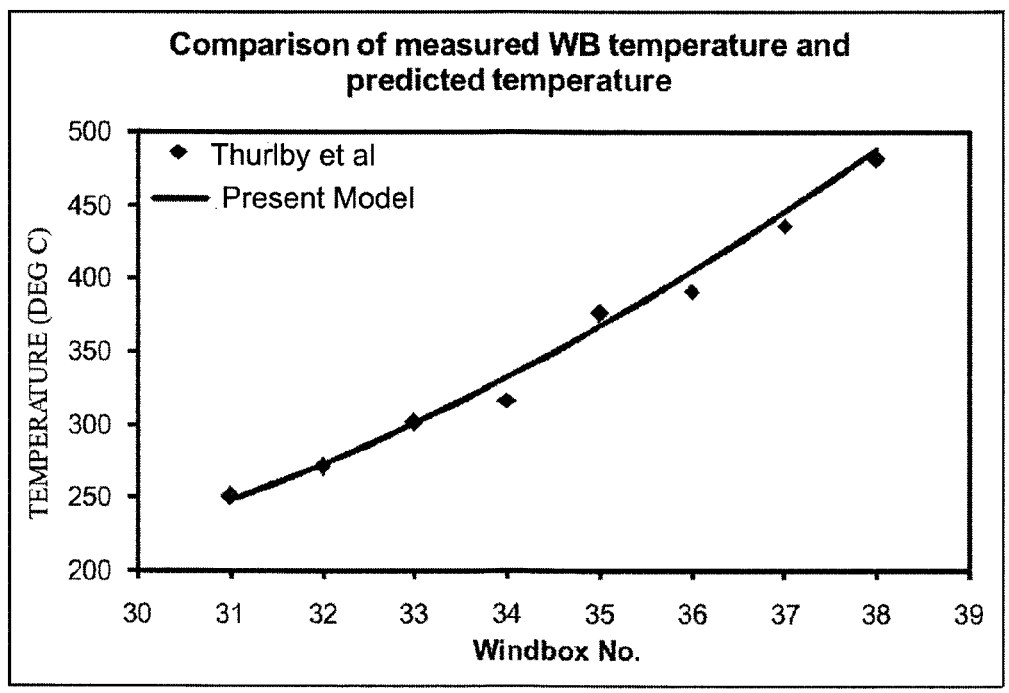
FIG. 7 illustrates a graphical representation for validation of the optimization system of present invention, showing a comparison of predicted wind box temperatures with actual measurements from an industrial induration furnace, data as published by Thurlby et. al. in Intl. J. Mineral Process. 6 (1979) 43-64, in accordance with the present invention.
Figure 8:
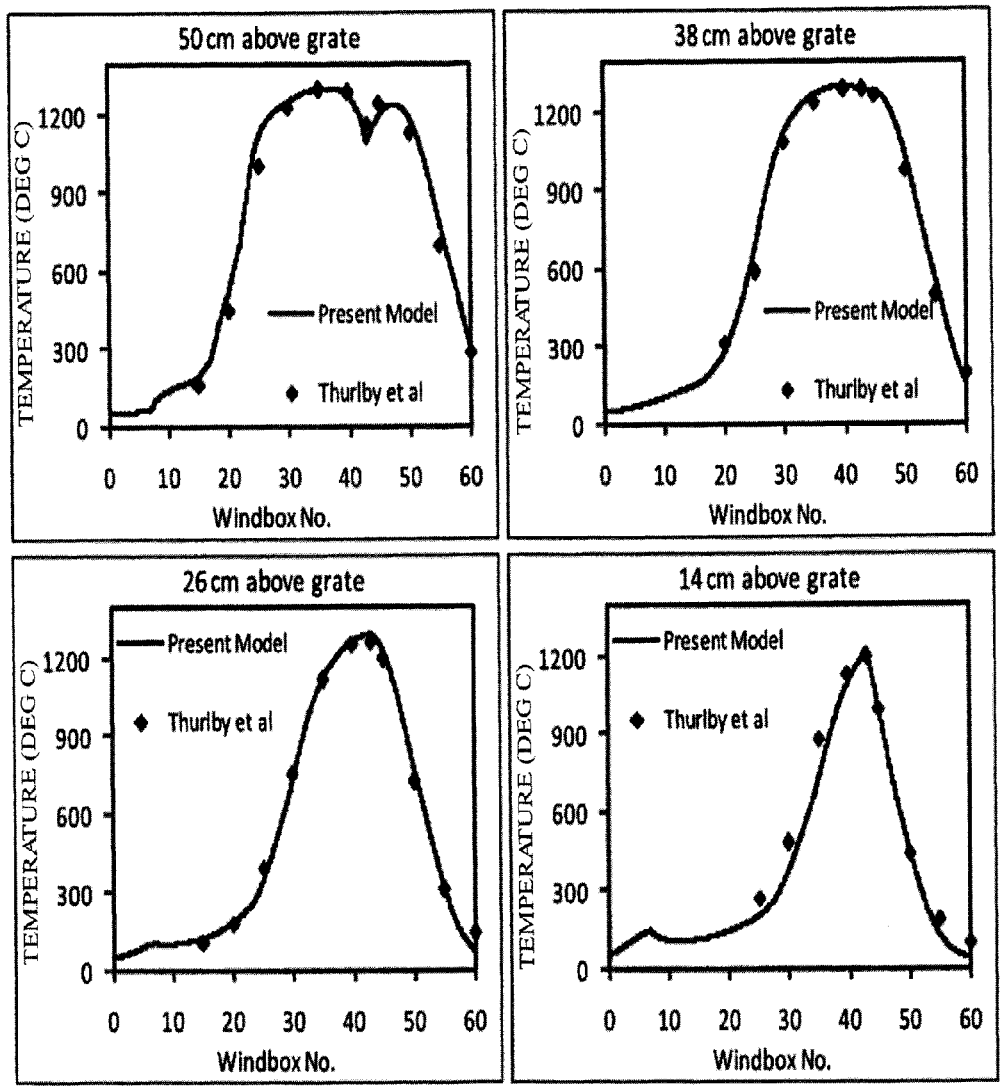
FIG. 8 illustrates a graphical representation for validation of the optimization system of present invention, showing a comparison of predicted bed temperatures with bed temperatures at various bed heights in different wind-boxes, data as published by Thurlby et. al. in Intl. J. Mineral Process. 6 (1979) 43-64, in accordance with the present invention.
Figure 9:
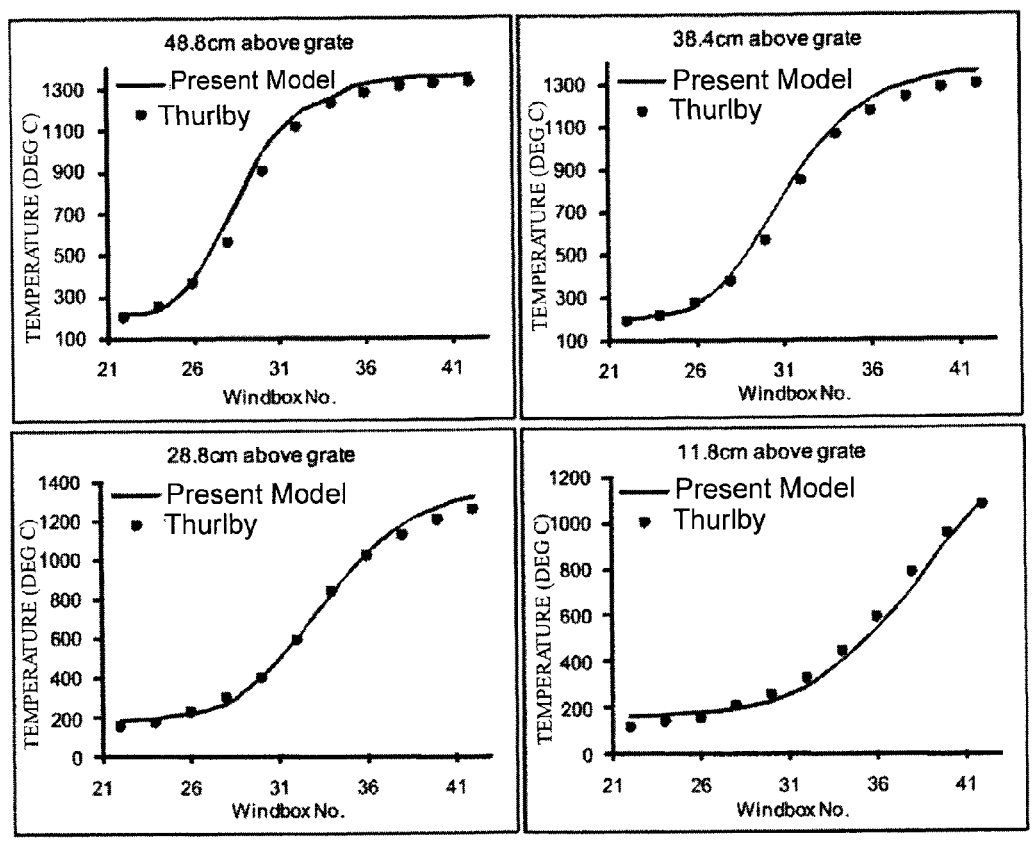
FIG. 9 illustrates a graphical representation for validation of the optimization system of present invention, showing a comparison of predicted bed temperatures with actual bed temperature measurements inside a pot grate unit at different bed heights, data as published by Thurlby et. al. in Intl. J. Mineral Process. 6 (1979) 43-64, in accordance with the present invention.

FIG. 6 illustrates a schematic showing the real-time prediction of the pellet bed temperature contours across various zones of the furnace 10 using the system 12 of the present invention. FIGS. 7, 8 and 9 show a graphical representation for validation of the optimization system 12 of the present invention, by comparing the simulated data, relating to wind box temperatures, bed temperatures at various bed heights, and bed temperatures along the length of the grate, with actual measurements obtained from an industrial induration furnace and a laboratory pot grate furnace by Thurlby et. al., as per the data published in Intl. J. Mineral Process. 6 (1979) 43-64. From FIGS. 7, 8 and 9, it is understood, that the simulated data, obtained using the process models of the present invention, for obtaining the directly immeasurable process parameters, is suitably accurate.

TECHNICAL ADVANTAGES

A system for optimizing the operation of an induration furnace used for the production of iron ore pellets, as disclosed in the present invention, has several technical advantages including but not limited to the realization of:
- a system for optimizing the operation of an induration furnace which increases the furnace productivity by real-time interaction;
- a system for optimizing the operation of an induration furnace which continuously monitors and controls the operation of the induration furnace through an interactive means, thereby giving a consistent product quality;
- a system for predicting the porosity and permeability of the granular packed bed;
- a system for predicting the fired pellet quality parameters, including cold compressive strength, tumble index and abrasion index, which cannot be measured on-line directly;
- a system for optimizing the operation of an induration furnace which predicts in real-time the directly immeasurable process parameters like the thermal profile of the solid phase and the gas phase inside the furnace in various sections of the furnace, composition profile of the various chemical species inside the furnace for both the solid and the gas phases, and the gas phase pressure drop across various zones of the furnace;
- a system for optimizing the operation of an induration furnace which reduces fuel consumption by the furnace;
- a system for optimizing the operation of an induration furnace which continuously monitors, in real-time, the thermal conditions inside the furnace; and
- a system for optimizing the operation of an induration furnace which reduces the overall operating and production costs of the induration process.

The numerical values mentioned for the various physical parameters, dimensions or quantities are only approximations and it is envisaged that the values higher/lower than the numerical values assigned to the parameters, dimensions or quantities fall within the scope of the invention, unless there is a statement in the specification specific to the contrary.

In view of the wide variety of embodiments to which the principles of the present invention can be applied, it should be understood that the illustrated embodiments are exemplary only. While considerable emphasis has been placed herein on the particular features of this invention, it will be appreciated that various modifications can be made, and that many changes can be made in the preferred embodiments without departing from the principle of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation.

The invention claimed is:

1. A system for optimizing the operation of an induration furnace, said system comprising:
    interactive means to monitor and control the furnace using an on-line non-linear predictive optimization algorithm for predicting the internal conditions of the furnace and optimizing the manipulated variables corresponding to the operation of the furnace to provide an optimized furnace operation, said interactive means selected from a group consisting of a programmable logic controller (PLC), a distributed control system (DCS), a supervisory control and data acquisition system (SCADA), and a laboratory information system (LIS), said interactive means adapted to communicate with the furnace, to retrieve, in real-time, online process data, and adapted to send, in real-time, the online process data for processing, and to generate an optimizing signal, based on the processing of real time, online process data and the data obtained from the laboratory information system and the data corresponding to dimensions and configuration of the induration furnace, to alter at least one process condition of the furnace to be communicated, to the furnace, for altering the process condition of the furnace with reference to the optimization signal;
    calibration means for simulating of induration of iron ore pellets inside the moving furnace for generating a plurality of ideal set points for validation purposes and generating a set of ideal set points after calibrating using the induration mathematical model, the parameters of the furnace model being manipulated during calibration to make the furnace work at an optimized level, said calibration means comprising a laboratory information system for receiving process information relating to the furnace, said process information being at least one selected from a group consisting of fired pellet quality parameters, physical characteristics of the iron ore, chemical characteristics of the iron ore, physical characteristics of the fuel (coal or coke), chemical characteristics of the fuel (coal or coke), physical characteristics of the flux (limestone) and chemical characteristics of the flux (limestone), data corresponding to operating conditions of the induration furnace and data corresponding to dimensions and configuration of the induration furnace with respect to recycling of exhaust gases, and adapted to process the information to generate and set the plurality of ideal set points to calibrate the furnace to operate at an optimized level, and setting a plurality of ideal set points for calibrating the operation of a furnace based on process information selected from the group; and
    a processing unit adapted to compare at least one active real time set point calculated based on the online process data derived from the furnace, the data obtained from the laboratory information system, data corresponding to operating conditions of the induration furnace and data corresponding to dimensions and configuration of the induration furnace with respect to recycling of exhaust gases with at least one of the plurality of ideal set points to perform real-time process optimization based on constraints on final product quality/process parameters, characteristics of raw materials used, process conditions of the induration furnace, induration furnace dimensions and configuration with respect to recycling of exhaust gases, said processing unit adapted to receive, in real-time, the online process data and the plurality of ideal set points, and comprising:
        computational means configured to compute a plurality of real-time active set points, using the online process data and laboratory analyses data obtained from the laboratory information system;
        corroboration means configured to match at least one of the plurality of real-time active set points with a corresponding ideal set point;
        alerting means configured to generate a signal, for optimization of at least one process condition, if at least one of the plurality of real-time active set point does not match the corresponding ideal set point; and
        optimization means configured to, on receiving the signal from said alerting means, generate at least one optimizing signal, which is communicated to said interactive means, for optimizing the operation of the furnace.

2. The system as claimed in claim 1, wherein said processing unit comprises receiver means to receive the online process data and the data from the laboratory information system from said interactive means and the plurality of ideal set points from said calibration means.

3. The system as claimed in claim 1, wherein said processing unit comprises a central repository to store the online process data, data obtained from the laboratory information system, data generated by the computational means, the plurality of ideal set points, the plurality of real-time active set points, and the optimizing signal, for a predetermined duration.

4. The system as claimed in claim 1, wherein said computational means is further adapted to compute, using the online process data and the data obtained from the laboratory information system, the directly immeasurable process parameters including the thermal profile of pellets and gas streams, the chemical composition profile of pellets and gas streams, pressure drop of the gas streams, pellet moisture drying profile, coal or coke combustion profile and limestone calcination profile across various sections of the furnace, and fired pellet quality parameters, including, cold compressive strength, tumble index and abrasion index, with respect to time.

5. The system as claimed in claim 1, wherein said processing unit includes output means adapted to transmit the optimizing signal to said interactive means and said central repository.

6. The system as claimed in claim 1, wherein a display module is provided between said interactive means and said processing unit.

7. The system as claimed in claim 1, wherein the online process data and the process information comprise dimensions of various sections of the furnace, wet iron ore pellet properties such as particle size distribution, chemical composition, moisture content, and particle size distributions of coal/coke and limestone, gas stream temperature, chemical composition, moisture content, pressure and flow rate, bed height, grate speed and details of the hearth layer.

8. A method for optimizing and controlling the operation of an induration furnace used for producing iron ore pellets, said method comprising the steps of:

generating a plurality of ideal set points, for validation purposes, by processing process information relating to the furnace selected from a group consisting of fired pellet quality parameters and physical and chemical characteristics of the iron ore, fuel (coal or coke) and flux (limestone), in calibration means having a laboratory information system;

retrieving, in real-time, the online process data, through interactive means selected from a group consisting of a programmable logic controller, a distributed control system, a laboratory information system, and a supervisory control and data acquisition system, wherein said interactive means are provided in communication with the furnace for real-time monitoring and control of the furnace, to provide an optimized furnace operation;

transmitting the online process data, laboratory analyses data obtained from the laboratory information system and the plurality of ideal set points to a processing unit for real-time optimization;

computing a plurality of real-time active set points by processing the online process data and laboratory analyses data in computational means of said processing unit;

matching at least one of the plurality of real-time active set points, with a corresponding ideal set point in corroboration means of said processing unit;

signaling for optimization in alerting means of said processing unit, if at least one of the plurality of real-time active set points does not match the corresponding ideal set point;

generating at least one optimizing signal in optimization means of said processing unit, for altering at least one process condition of the furnace; and communicating the optimizing signal to said interactive means for optimizing the operation of the furnace, in real-time.

9. The method as claimed in claim 8, which includes the step of storing the online process data, data obtained from the laboratory information system, data generated by the computational means, the plurality of ideal set points, the plurality of real-time active set points, and the optimizing signal in a central repository.

10. The method as claimed in claim 8, which includes the step of transmitting the optimizing signal manually or automatically to said interactive means.

11. The method as claimed in claim 8, which includes the step of interfacing said processing unit with the furnace via said interactive means.

12. The method as claimed in claim 8, which includes the step of obtaining a detailed analysis of the process in the off-line mode.

13. The method as claimed in claim 8, which includes the step of optimizing the process condition selected from the group consisting of height of the pellet bed, speed of the moving grate, flow rate of the cooling gas streams, temperature of the ignition gas and pressure drop of the gas streams in various sections of the furnace.

14. The method as claimed in claim 8, which includes the step of selecting the plurality of set points from the flow rate of pellets on the grate and the quality parameters of the final product.

* * * * *